Patented Nov. 19, 1929

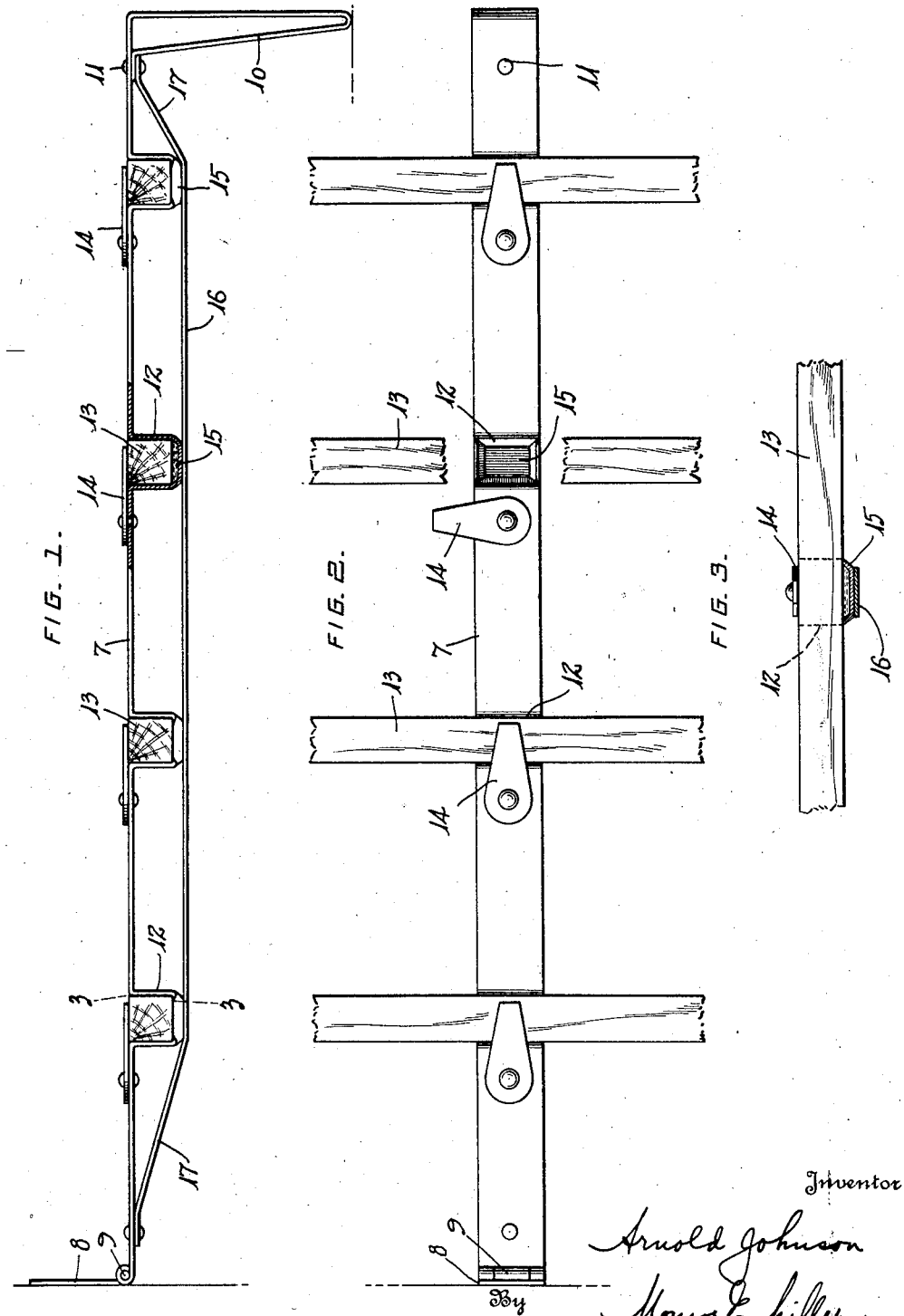

1,736,499

UNITED STATES PATENT OFFICE

ARNOLD JOHNSON, OF DEVILS LAKE, NORTH DAKOTA

VERMINPROOF PERCH SUPPORT

Application filed March 2, 1928. Serial No. 258,649.

The present invention relates to poultry roosts and aims to provide novel and improved means for supporting perch bars.

Another object is the provision of novel perch supporting means having provision for holding an insecticide so as to render the perches vermin proof.

It is also an object of the invention to provide a perch support of simple and inexpensive construction for removably holding the perch bars in an effective manner.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved perch support, a portion thereof being shown in section.

Fig. 2 is a plan view of the support, with a portion of one perch bar broken away.

Fig. 3 is a cross section of the perch support, taken on the line 3—3 of Fig. 1.

The perch support comprises a bar or strip 7 of suitable metal, and, as shown, a hinge leaf 8 is hinged, as at 9, to one end of the support 7, in order that the support may be hingedly connected with a wall or other object, to enable the perch support to be swung upwardly when cleaning out underneath. The free end of the support is bent downwardly and doubled back, to form a leg 10, and is secured by a rivet 11 or otherwise. The leg may rest on a dropping board or on the floor, and may be of any suitable height.

The support 7 is provided at spaced points with downwardly offset portions 12 forming seats to receive the perch bars 13 which are of wood or other suitable material, and any number of supports may be used, and each support may be made to accommodate a suitable number of perches. As shown, the perch bars are of square cross-section in order that they may be placed in the offsets or seats 12 with any side uppermost. Latches 14 are pivoted on the support 7 and may be swung over the bars 13 to hold same in place, and by swinging the latches away from the offsets 12, the bars 13 are released in order that they may be removed.

The bottom or yoke portions of the offsets 12 are pressed into cups 15 for holding insecticide, and the bars 13 extending over the mouths of said cups will result in the liquid and vapor rising from the cups being applied to the perch bars, so as to destroy the vermin and render the perches sanitary. The insecticide is readily placed in the cups when the perch bars are lifted or removed from the offsets 12.

The perch support 7, with the offsets or seats 12 for the perches, and the receptacles 15, may thus be readily formed from a single bar or strap of metal, and the support may be stiffened or reinforced to prevent downward bending thereof, especially when the support is of considerable length. For example, a strap 16 of metal may extend under the offsets 12 to contact with the receptacles 15, with its terminals 17 bent upwardly and secured to the support 7, so as to form a truss that will prevent the support 7 from yielding between its ends under the weight of the perches and poultry.

Having thus described the invention, what is claimed as new is:—

1. A perch support comprising a metal bar having bends forming downwardly offset perch-receiving portions provided with insecticide holding means.

2. A perch support comprising a metal bar having bends forming downwardly offset perch-receiving portions provided with insecticide holding cups.

3. A perch support comprising a metal bar having bends forming a downwardly offset perch-receiving portion, the bottom of which is formed with a cup to hold insecticide below the perch.

4. A perch support formed from a strip of metal having spaced downwardly offset perch-receiving portions, the bottoms of said portions being pressed into insecticide holding cups.

5. A perch support having a portion to receive a perch, and the bottom of said portion forming an insecticide holding cup.

6. A perch support comprising a metal bar having bends forming spaced downwardly offset perch-receiving portions, and a truss strap secured at its ends to said bar and extending below and contacting with said portions between its ends.

In testimony whereof I hereunto affix my signature.

ARNOLD JOHNSON.